(12) United States Patent
Morikawa et al.

(10) Patent No.: US 11,960,948 B2
(45) Date of Patent: Apr. 16, 2024

(54) PRINTING DEVICE PERFORMING HALFTONE PROCESS TO CONVERT IMAGE DATA ACCORDING TO TARGET CONVERSION METHOD

(71) Applicant: BROTHER KOGYO KABUSHIKI KAISHA, Nagoya (JP)

(72) Inventors: Shota Morikawa, Nagoya (JP); Kodai Mizuno, Hekinan (JP); Hitomi Miwa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/188,604

(22) Filed: Mar. 23, 2023

(65) Prior Publication Data

US 2023/0316027 A1 Oct. 5, 2023

(30) Foreign Application Priority Data

Mar. 31, 2022 (JP) ................. 2022-059960

(51) Int. Cl.
  *G06K 15/10* (2006.01)
  *G06K 15/02* (2006.01)
(52) U.S. Cl.
  CPC ....... *G06K 15/1881* (2013.01); *G06K 15/021* (2013.01); *G06K 15/102* (2013.01)
(58) Field of Classification Search
  None
  See application file for complete search history.

(56) References Cited

U.S. PATENT DOCUMENTS

| 8,363,275 | B2 * | 1/2013 | Kondo | G06K 15/1871 |
| | | | | 358/529 |
| 9,400,948 | B2 * | 7/2016 | Ozawa | H04N 1/4051 |
| 2009/0268240 | A1 * | 10/2009 | Watanabe | H04N 1/4052 |
| | | | | 358/1.15 |
| 2012/0224227 | A1 | 9/2012 | Kukino | |
| 2018/0141352 | A1 | 5/2018 | Watanabe | |
| 2021/0357713 | A1 * | 11/2021 | Shimomura | H04N 1/4072 |

FOREIGN PATENT DOCUMENTS

| JP | 2012-179823 A | 9/2012 |
| JP | 2018-083290 A | 5/2018 |

* cited by examiner

*Primary Examiner* — Henok Shiferaw
(74) *Attorney, Agent, or Firm* — Scully, Scott, Murphy & Presser, PC

(57) ABSTRACT

In a printing device, a head ejects ink on each of a plurality of printing media. Each of the plurality of printing media is classified into one of a plurality of media types. A control device acquires image data, and performs a halftone process to convert the image data to print data for controlling the head to eject the ink. The control device controls the head to eject the ink to print the image on the basis of the print data. Before the controlling, the control device acquires media information indicating, as an indicated media type, a media type from among the plurality of media types; and performs a decision process to decide a target conversion method from among a plurality of conversion methods on the basis of the indicated media type. The halftone process converts the image data to the print data according to the target conversion method.

17 Claims, 14 Drawing Sheets

FIG. 4

|  | FIRST METHOD | SECOND METHOD | THIRD METHOD | FOURTH METHOD |
|---|---|---|---|---|
| FIRST MEDIUM | ○ | ○ | △ | △ |
| SECOND MEDIUM | × | × | ○ | △ |
| THIRD MEDIUM | × | × | × | ○ |

○: COMPATIBLE
△: OVERENGINEERING
×: INCOMPATIBLE

FIG. 11

| R | G | B | COLOR-SPECIFIC EVALUATION |
|---|---|---|---|
| 0 | 0 | 0 | 0 |
| 0 | 0 | 32 | 80 |
| . | . | . | . |
| 0 | 0 | 255 | 10 |
| . | . | . | . |
| 190 | 128 | 64 | 20 |
| . | . | . | . |
| 192 | 208 | 240 | 40 |
| . | . | . | . |
| 255 | 255 | 255 | 0 |

PRINTING DEVICE PERFORMING HALFTONE PROCESS TO CONVERT IMAGE DATA ACCORDING TO TARGET CONVERSION METHOD

REFERENCE TO RELATED APPLICATIONS

This application claims priority from Japanese Patent Application No. 2022-059960 filed on Mar. 31, 2022. The entire content of the priority application is incorporated herein by reference.

BACKGROUND ART

A conventional printing device forms images on various types of printing media by ejecting ink. When the printing device runs out of paper that has been supplied from a given paper feed port during printing, the device is configured to continue printing by supplying an alternate paper from a different paper feed port according to the paper type. Here, "paper type" refers to the type of paper quality and may be one of plain paper, heavyweight paper, recycled paper, letterhead paper, colored paper, pre-printed paper, fine art paper, and the like.

DESCRIPTION

However, since different printing media have different material qualities and surface profiles, ink impacting the printing media also takes on different forms. For example, the graininess of ink tends to be more noticeable on a printing medium not susceptible to bleeding than on a printing medium susceptible to bleeding. Further, there are a variety of known methods for halftone processing used to express grayscale levels of an image in multiple gradations by controlling the density of ink droplets impacting the printing medium. However, the noticeability of graininess and the occurrence of periodic patterns in a printed image differ according to the method employed.

In view of the foregoing, it is an object of the present disclosure to provide a printing device capable of printing according to a halftone process suited to the printing medium, and a method and a computer program for controlling the printing device.

In order to attain the above and other object, the present disclosure provides a printing device. The printing device includes a head, and a control device. The head is configured to eject ink on each of a plurality of printing media. Each of the plurality of printing media is classified into one of a plurality of media types. The control device is configured to perform: acquiring image data representing an image; a halftone process to convert the image data to print data for controlling the head to eject the ink; and controlling the head to eject the ink to print the image on the basis of the print data. The control device is configured to further perform, before the controlling: acquiring media information indicating, as an indicated media type, a media type from among the plurality of media types; and a decision process to decide a target conversion method from among a plurality of conversion methods on the basis of the indicated media type. The halftone process converts the image data to the print data according to the target conversion method.

According to another aspect, the disclosure provides a method for controlling a printing device including a head configured to eject ink on each of a plurality of printing media. Each of the plurality of printing media is classified into one of a plurality of media types. The method includes: acquiring image data representing an image; performing a halftone process to convert the image data to print data for controlling the head to eject the ink; and controlling the head to eject the ink to print the image on the basis of the print data. The method further include, before the controlling: acquiring media information indicating, as an indicated media type, a media type from among the plurality of media types; and performing a decision process to decide a target conversion method from among a plurality of conversion methods on the basis of the indicated media type. The halftone process converts the image data to the print data according to the target conversion method.

According to another aspect, the disclosure provides a non-transitory computer readable storage medium storing a set of program instructions for a printing device. The printing device includes a head configured to eject ink on each of a plurality of printing media. Each of the plurality of printing media is classified into one of a plurality of media types. The set of program instructions includes: acquiring image data representing an image; a halftone process to convert the image data to print data for controlling the head to eject the ink; and controlling the head to eject the ink to print the image on the basis of the print data. The control device is configured to further perform, before the controlling: acquiring media information indicating, as an indicated media type, a media type from among the plurality of media types; and a decision process to decide a target conversion method from among a plurality of conversion methods on the basis of the indicated media type. The halftone process converts the image data to the print data according to the target conversion method.

In the above structures, the target conversion method for the halftone process can be decided in a manner appropriate for the printing medium.

FIG. 4 is a table showing correspondence information stored in a storage.

FIG. 11 is a chart showing a color-specific evaluation LUT.

Figure 1:
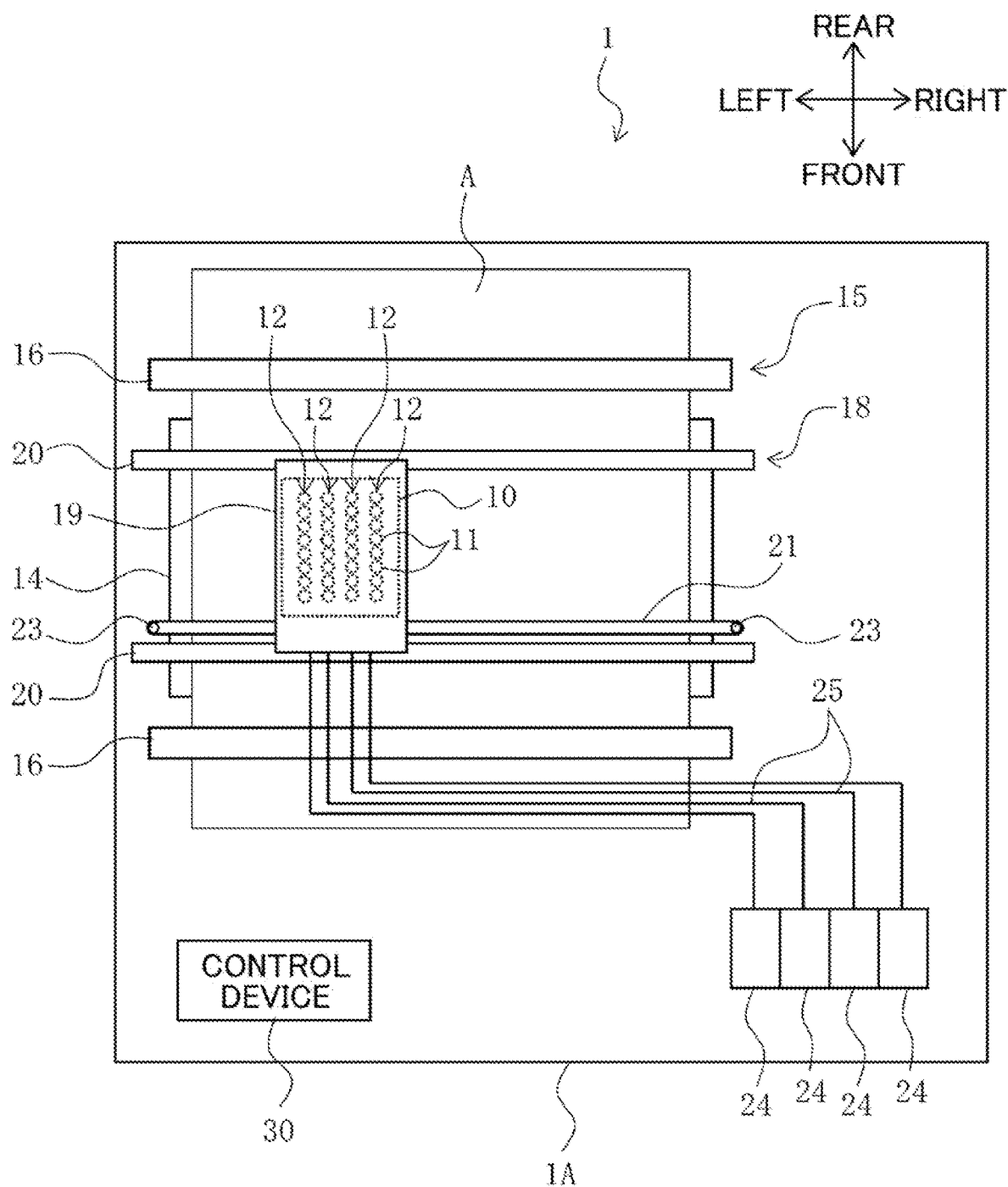
FIG. 1 is a schematic diagram of a printing device.

The embodiment of a printing device 1 will be described while referring to accompanied drawings wherein like parts and components are designated with the same reference numerals to avoid duplicating description.

Configuration of the Printing Device

FIG. 1 is a schematic diagram of the printing device 1 according to the present embodiment. The printing device 1 prints an image on a printing medium A by ejecting ink from a print head 10 based on image data. In the example described below, an inkjet printer is applied as the printing device 1.

The printing device 1 employs a serial print head system and alternates between a process for forming images by ejecting ink in a plurality of colors as the print head 10 is moved, and a process for conveying the printing medium A. Hereinafter, the direction in which the printing medium A is conveyed will be called the front-rear direction. Of the two directions orthogonal to this front-rear direction, the direction in which the print head 10 moves will be called the left-right direction, while the other direction will be called the up-down direction. However, the layout and directions of operations in the printing device 1 are not limited to these directions.

The printing device 1 has a housing 1A. The print head 10 is accommodated in the housing 1A. In the printing device 1 according to the present embodiment, the print head 10 has a plurality of nozzle rows 12, including at least one nozzle row 12 for each color of ink, for example. Each nozzle row 12 includes a plurality of nozzles 11 aligned in the front-rear direction. The nozzles 11 open downward for ejecting ink. The print head 10 is further provided with a drive element 13 (see FIG. 2) for each nozzle 11. The drive elements 13 are piezoelectric elements, heating elements, or electrostatic actuators. When driven, the drive elements 13 apply pressure to ink in the print head 10 for ejecting ink from the corresponding nozzles 11.

The printing device 1 is provided with a platen 14 that opposes the print head 10. The platen 14 is disposed below the print head 10 and is separated from the print head 10 by a prescribed distance. The platen 14 has a flat top surface for supporting the printing medium A from below.

The printing device 1 is provided with a conveying device 15 that conveys the printing medium A over the platen 14. The conveying device 15 has two conveying rollers 16, and a conveying motor 17 (see FIG. 2), for example. The conveying rollers 16 are separated from each other and disposed on opposite sides of the platen 14 in the front-rear direction. The conveying rollers 16 are connected to the rotational shaft of the conveying motor 17 via reduction mechanisms. Hence, when the conveying motor 17 is driven, the two conveying rollers 16 rotate about their axial centers and convey a printing medium A over the platen 14 in the front-rear direction.

The printing device 1 is also provided with a scanning device 18 that moves the print head 10 in the left-right direction. The scanning device 18 has a carriage 19, two guide rails 20, an endless belt 21, and a scanning motor 22 (see FIG. 2). The carriage 19 is a housing that supports the print head 10. The guide rails 20 extend left and right so as to cross over the platen 14 and are spaced apart in the front-rear direction with the print head 10 interposed therebetween. The carriage 19 is supported on these guide rails 20 so as to be movable in the left-right direction.

The belt 21 is wrapped around two pulleys 23 disposed near respective left and right ends of one guide rail 20 and is connected to the carriage 19 at a prescribed point. A rotational shaft of the scanning motor 22 (FIG. 2) is connected to one of the left or right pulleys 23 via a reduction mechanism. Hence, when the scanning motor 22 of this scanning device 18 is driven to rotate, the belt 21 circulates, causing the carriage 19 that supports the print head 10 to move in the left-right direction over the guide rails 20.

The printing device 1 is further provided with a plurality of tanks 24 that stores ink of corresponding colors to be supplied to the print head 10. The tanks 24 are mounted in the housing 1A by opening a cover (not shown) provided on the housing 1A. The printing device 1 of the present embodiment uses ink in the four colors of cyan, yellow, magenta, and black. Accordingly, the printing device 1 is provided with four tanks 24 in this example. Additionally, one end of a flexible tube 25 is connected to each tank 24, and the other end is connected to an ink supply port in the print head 10. Thus, ink is supplied from the tanks 24 to the print head 10 via the tubes 25.

Figure 2:
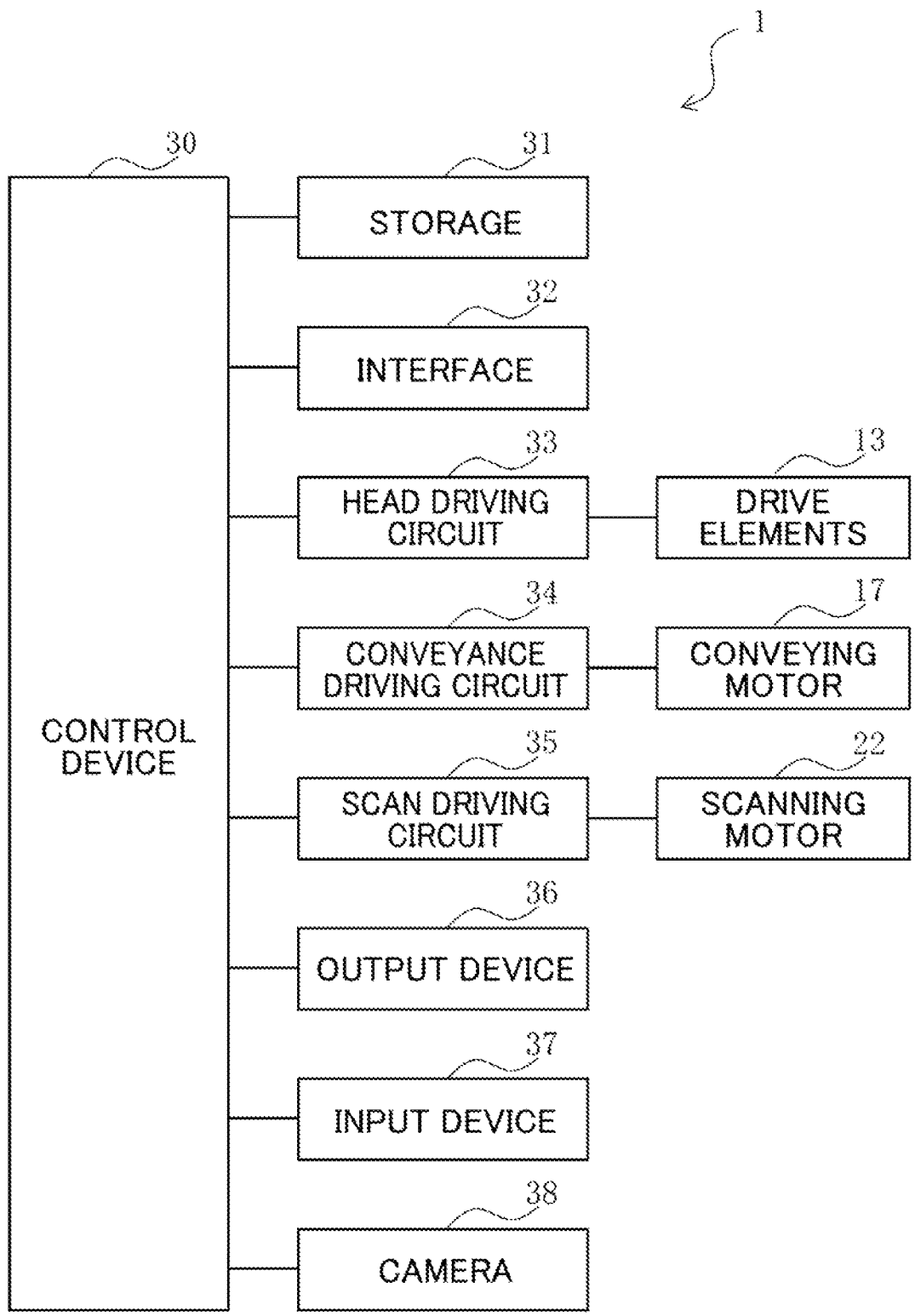
FIG. 2 is a block diagram showing a functional configuration of the printing device.

FIG. 2 is a block diagram showing the functional configuration of the printing device 1. As shown in FIG. 2, the printing device 1 is provided with a control device (controller) 30. The printing device 1 further includes a storage 31, an interface 32, a head driving circuit 33, a conveyance driving circuit 34, a scan driving circuit 35, an output device (output interface) 36, an input device (input interface) 37, and a camera 38 which are connected to the control device 30.

The control device 30 is a computer, for example, that includes a processor such as a microprocessor, an integrated circuit such as an ASIC, or other circuitry. The storage 31 is memory accessible from the control device 30 and includes RAM and ROM, for example. Of these, the RAM temporarily stores image data and various other data used during operations or calculations of the control device 30. The ROM stores computer programs and data for performing various data processes. Accordingly, the control device 30 controls the operations of each component in the printing device 1 by executing computer programs while referencing data stored in the storage 31.

The interface 32 is a connection device for connecting the control device 30 to a device outside the printing device 1. Examples of such external devices include other computers, communication networks, recording media, displays, and other printing devices. The printing device 1 acquires image data and print settings information from an external device, such as a computer, via this interface 32. One example of this image data may be raster data representing an image to be printed on the printing medium A. Specifically, the image data includes a plurality of pixels and a plurality of color values (pixel color values) for respective ones of the plurality of pixels. Here, each color value includes R, G, and B values (RGB values) for representing color.

The head driving circuit 33 is electrically connected to each of the drive elements 13 in the print head 10 and controls the operations of each drive element 13. In other words, the control device 30 outputs control signals to the head driving circuit 33 for driving drive elements 13, and the head driving circuit 33 generates drive signals based on the inputted control signals and outputs these drive signals to the respective drive elements 13. As a result, each drive element 13 is driven based on the corresponding drive signal to apply a predetermined ejection pressure to ink in the print head 10 at prescribed timings. Accordingly, the head driving circuit 33 can control the timing at which ink is ejected from each nozzle 11 and the size of the ejected ink (the volume of the ink droplet).

The conveyance driving circuit 34 is electrically connected to the conveying motor 17 provided in the conveying device 15. The control device 30 can control operations of the conveying motor 17 via the conveyance driving circuit 34. Through this control, the conveying device 15 can convey the printing medium A in the front-rear direction over the platen 14, either intermittently or continuously, and can also keep the printing medium A halted at a prescribed position on the platen 14.

The scan driving circuit 35 is electrically connected to the scanning motor 22 provided in the scanning device 18. The control device 30 can control operations of the scanning motor 22 via the scan driving circuit 35. Through this control, the scanning device 18 can move the carriage 19, which supports the print head 10, at different speeds in the left-right direction and can also halt the carriage 19 at any position within its range of movement.

The output device 36 outputs various information, including warnings or alarms, externally. The information on warnings or alarms is an example of the warning information. The output device 36 may include a display and speakers, for example. The display can display images, text, and the like to output information to the user. The speakers can emit sounds (alarms) to output information to the user. The input device 37 includes a touchscreen or physical switches, for example, that accept (or receive) information inputted externally. The input device 37 is provided in a position easily accessible by the user, such as the top surface or front surface on the housing 1A of the printing device 1. Upon receiving user operations, the input device 37 outputs information on the received operations to the control device 30. The camera 38 is a CMOS sensor or the like having a plurality of photodiodes, for example. The camera 38 is disposed in the housing 1A at a position facing the platen 14 from above. The camera 38 captures images on the surface of the printing medium A supported on the platen 14 and outputs the captured images to the control device 30.

Printing Operations

With the printing device 1 having the above configuration, the control device 30 acquires image data via the interface 32 and executes a halftone process, a printing process, and the like based on this image data. The halftone process is performed to convert the image data to print data used for ejecting ink from the print head 10, and particularly is a process of converting the image data to data representing gradations or grayscale images with ink droplets of predetermined volumes. Specifically, the halftone process converts image data to print data so that the print data includes grayscale (gradation) values expressed in reduced grayscale (gradation) levels for each of the four ink colors cyan, yellow, magenta, and black. Here, the image data is expressed in 256 grayscale levels, whereas the print data is expressed by the reduced grayscale levels (four levels): "no dot," "small dot," "medium dot," and "large dot". The control device 30 can execute a plurality of conversion methods in the halftone process, such as a first through fourth methods. Here, the first method is a dither method to convert each color value in the image data into one of two values. The second method is an error diffusion method to convert each color value in the image data into one of two values. The third method is a dither method to convert each color value in the image data into one of four values. The fourth method is an error diffusion method to convert each color value in the image data into one of four values.

The above methods are all well-known and will only be described briefly here. The dither method with two values (the first method) is a method of data conversion that divides the image represented by the image data into small blocks and converts the grayscale value for each block to a binary value by comparing the grayscale values to a single preset threshold value, where ink ejection is assigned to one of the binary values (two values) and ink non-ejection is assigned to the other. In the case of binary values, a large volume of ink is assigned to ink ejection. In contrast, the dither method with four values (the third method) is a method of data conversion that has three preset threshold values. The third method compares the grayscale value of each block to these threshold values to convert the grayscale value to one of four values, where a large volume of ink ejection, a medium volume of ink ejection, a small volume of ink ejection, and no ink ejection are assigned to respective ones of the four values.

The error diffusion method with two values (the second method) is similar to the dither method with two values but differs in that error between the original grayscale value of a certain block and the grayscale value of the block after data conversion is added to the original grayscale value of a neighboring block prior to performing data conversion on that neighboring block. Further, the error diffusion method with four values (the fourth method) is similar to the error diffusion method with two values but has three preset threshold values for converting the value of each block to one of four values.

The first through fourth conversion methods used in the halftone process have the following characteristics. The time required to create printing data by converting data according to each method is shortest when using the first method and sequentially longer when using the second method, third method, and fourth method. The size of print data created using the first method and second method is about the same and relatively small. The size of print data created using the third and fourth methods is about the same but larger than that produced in the first and second methods. The degree to which periodicity at grayscale levels and the like can be perceived in an image printed using the converted print data (hereinafter called "noticeable periodicity") is greatest for the first method, about the same for the second and third methods, and least for the fourth method. The degree to which graininess is perceived in an image based on the print data, i.e., the tendency for halftone processing to make ink on the printing medium A appear grainy (hereinafter called noticeable graininess) is about the same for the first and second methods and relatively large, and is about the same for the third and fourth methods and smaller than that for the first and second methods.

After performing a halftone process according to any of the above conversion methods, the control device 30 performs a printing process using the print data produced from the halftone process. For example, the control device 30 controls the conveying device 15 to convey the printing medium A and to halt the printing medium A at a prescribed position on the platen 14. Next, the control device 30 controls the scanning device 18 to move the print head 10 in the left-right direction while controlling the print head 10 to eject ink from the nozzles 11 onto the printing medium A. By alternately repeating operations to convey the printing medium A and to eject ink in this way, the printing device 1 prints an image on the printing medium A corresponding to the image data.

The printing device 1 can print on a plurality of types of print media A, such as fabric (the first medium), paper other than glossy paper (nonglossy paper; the second medium), and glossy paper and plastic film (the third medium). In other words, the plurality of types of print media A includes a fabric type indicating one or more fabric sheets, a nonglossy paper type indicating one or more nonglossy papers, a glossy paper type indicating one or more glossy papers, and a plastic film type indicating one or more plastic films. These media also have varying characteristics (properties) related to periodicity and graininess, as follows. Periodicity and graininess are least noticeable when printing on the first medium, followed in order by the second and third media.

Operations of the Control Device

When executing a halftone process, the printing device 1 according to the present embodiment determines the conversion method suited to the type of printing medium A (media type). As described above, there is a plurality of data conversion methods that can be implemented in a halftone process, each type having its own characteristics. There is also a plurality of types of printing media A, as described above, each type having its own characteristics. Hence, the printing device 1 executes a "decision process" to set (select) the conversion method for the halftone process suited to the type of printing medium A being used in such a manner that the image to be printed using the decided conversion method can meet the requirements such as the requirements with respect to the noticeable graininess and/or the noticeable periodicity. The printing device 1 may execute the decision process to set the conversion method in such a manner that the time period required to creating the print data in the halftone process can be reduced. Hereinafter, the conversion method decided in the decision process is referred to as the "active conversion method". The operations of the printing device 1 in this decision process are described below. The active conversion method is an example of the target conversion method.

First Example of the Decision Process

Figure 3:
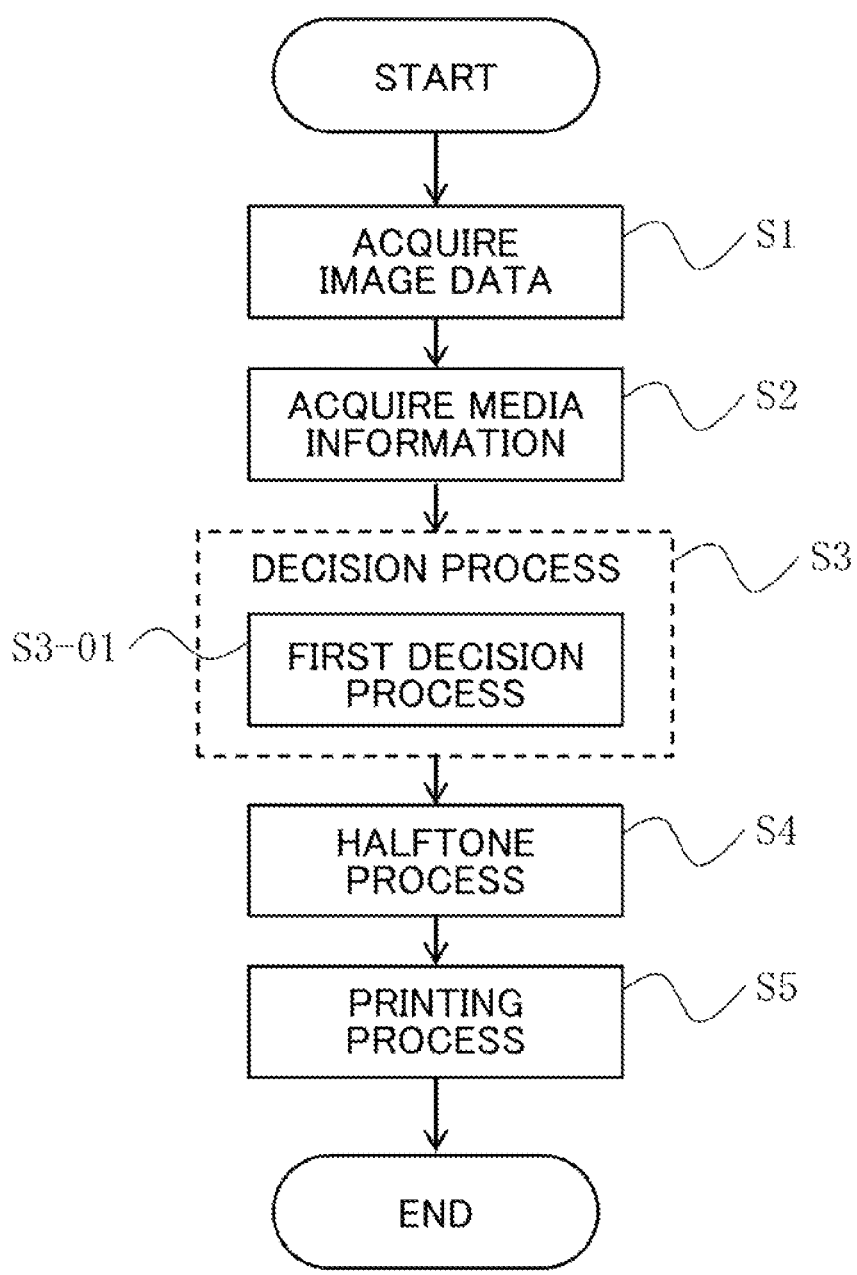
FIG. 3 is a flowchart showing a series of operations executed by a control device that includes a decision process concerning a halftone process.

FIG. 3 is a flowchart showing a series of operations executed by the control device 30 that includes an example of the decision process (first example) concerning the halftone process. The control device 30 executes the following steps according to this flowchart after receiving a print job. In S1 of FIG. 3, the control device 30 executes a process to acquire image data. Specifically, the control device 30 acquires the image data that is inputted via the interface 32 from an external device, such as a computer. In S2 the control device 30 executes a process to acquire media information (the acquisition process).

The media information in this example specifies the type of printing medium A on which the image is to be printed. In this embodiment, the media information includes one of the three types described above (first through third media). The control device 30 may acquire this media information on the basis of an image captured by the camera 38 of the printing medium A resting on the platen 14. Alternatively, the control device 30 may acquire print settings information that includes a printing resolution and the media information via the interface 32 together with the image data acquired in S1, and the control device 30 may obtain the media information from this print settings information. In this case, a print job is configured of header information having the print settings information and the image data, and the control device 30 acquires this print job via the interface 32. The control device 30 further acquires the print settings information from the header information in the print job. Further, the control device 30 may acquire the print settings information inputted from an external device or the print settings information on the basis of content that the user inputs via the input device 37. The media type indicated by the media information is an example of the indicated media type.

In S3 the control device 30 executes the decision process to decide the conversion method to be used in the halftone process on the basis of the media information. That is, in this decision process the control device 30 selects, on the basis of the media information, one of the conversion methods for the halftone process (from among the first through fourth methods described above) as the active conversion method used in the halftone process. The decision process is an example of the selection process to select an active conversion method from among a plurality of conversion methods on the basis of the indicated media type.

In S4 the control device 30 executes a halftone process according to the active conversion method that was set in the decision process of S3. In other words, the active conversion method is used in the halftone process to create print data by converting the image data. In S5 the control device 30 executes a printing process using this print data by ejecting ink from nozzles 11 in the print head 10 to form an image on the printing medium A.

This process enables the control device 30 to execute the halftone process using a type of conversion method that is suitable for the type of printing medium A being used.

The following description is a specific example of the decision process in S3 described above (first example). The storage 31 in the present embodiment may store correspondence information (e.g., table information) associating types of printing media A with types of conversion methods for the halftone process. In the decision process, the control device 30 may then execute a first decision process (S3-01) for determining the active conversion method on the basis of both the media information acquired in S2 and the correspondence information stored in the storage 31.

FIG. 4 is a table showing an example of correspondence information stored in the storage 31. The correspondence information shown in FIG. 4 provides correlations between the first through third media pertaining to the types of printing media A and the first through fourth methods pertaining to the types of conversion methods for the halftone process. Further, this correspondence information is created from two perspectives (or requirements, or purposes): the perspective of suppressing graininess in the range of human visibility (the perspective of graininess suppression) and the perspective of avoiding excessive suppression of graininess outside this range that could lead to an increase in the data conversion time and an increase in data size (the perspective of overengineering avoidance). The perspectives are related to the quality of the printing image, and the correspondence information is used for improving the printing quality. Specifically, the correspondence information includes a validity for each media type and each conversion methods. Here, in this example, the validity is one of: "compatible" indicating that the conversion method is compatible with the media type; "overengineering" indicating that the conversion method causes overengineering when printing an image on the media type; and "incompatible" indicating that the conversion method is incompatible with the media type.

In the example shown in FIG. 4, the correspondence information is created for suppressing the graininess. The first method and second method are designated as compatible with (suitable for) the first medium, while the third and fourth methods are overengineered. For the second medium, the first and second methods are designated as incompatible (unsuitable) because noticeable graininess remains, the third method is designated as compatible (suitable), and the fourth method is designated as overengineered. For the third medium, the first through third methods are designated as incompatible (unsuitable) while the fourth method is compatible (suitable).

In the first decision process of S3-01, the control device 30 decides the active conversion method on the basis of the media information and correspondence information. That is, the control device 30 decides which one of the first through third media is specified in the media information acquired in S2 and sets the active conversion method to the conversion method compatible with (suited for) the decided media type. There may be cases in which more than one conversion method is compatible with (suitable for) one type of medium, as in the example of FIG. 4. In such cases, the conversion method is decided by using (or, on the basis of) characteristics other than the graininess of each type of conversion method should be considered. In the example of FIG. 4, the first and second methods are compatible with the first medium. However, when it is desirable to suppress periodicity in the printed image, the control device 30 may set the second method as the active conversion method because the second method can better suppress noticeable periodicity. Alternatively, the control device 30 may select one of the first and second conversion methods by using (or, on the basis of) an estimated time required to convert the image data. That is, the control device 30 may select one of the first and second conversion methods so that the time required to convert the image data in the halftone process can be reduced.

Figure 5:
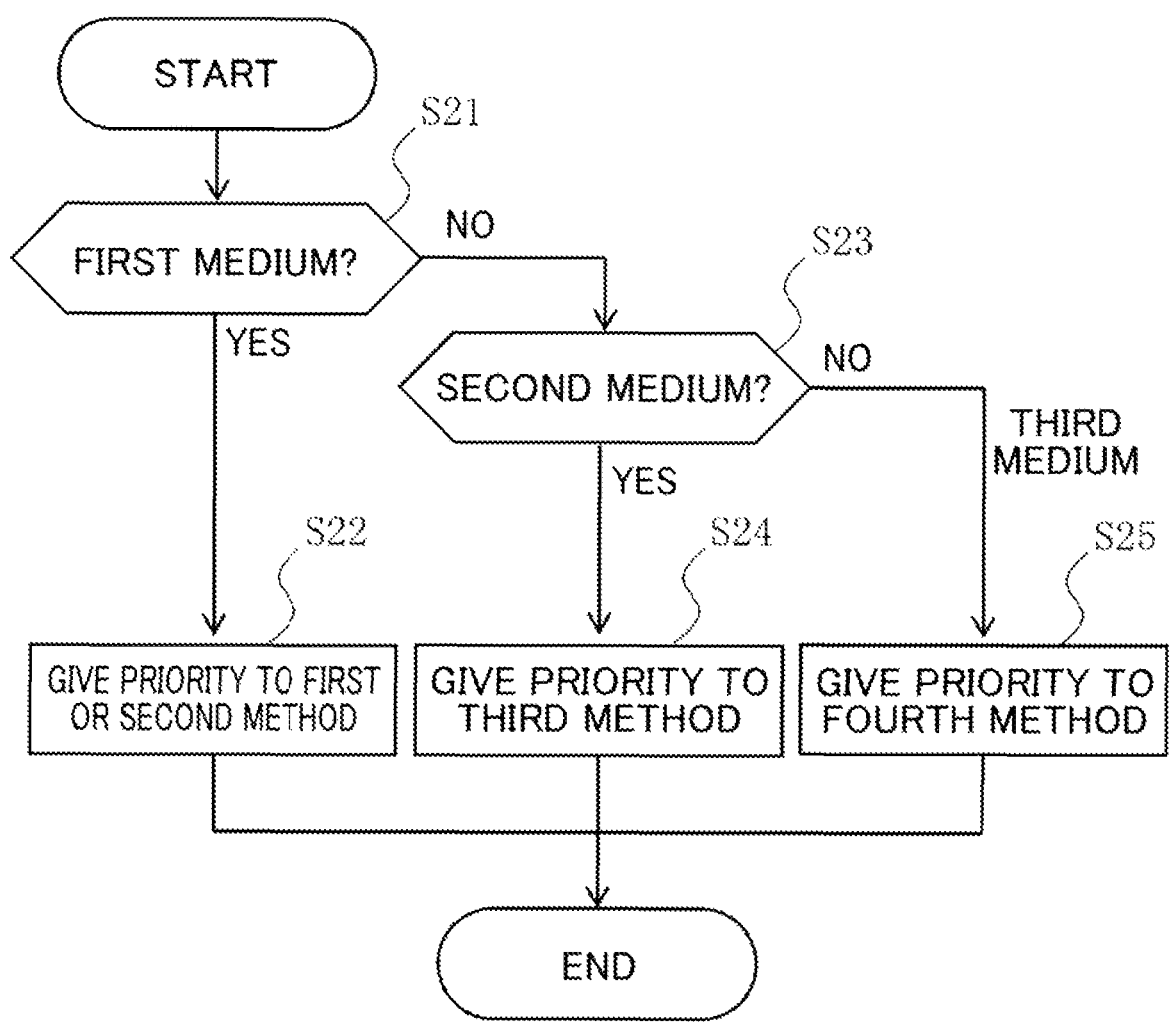
FIG. 5 is a flowchart showing operations of the control device performed when determining an active conversion method on the basis of media information.

Rather than determining the active conversion method on the basis of the correspondence information described above, the control device 30 may decide the active conversion method according to the process shown in FIG. 5. FIG. 5 is a flowchart showing operations of the control device 30 performed when determining the active conversion method on the basis of the media information. In S21 of FIG. 5, the control device 30 decides whether the printing medium A is the first medium on the basis of the acquired media information. When the control device 30 decides that the printing medium A is the first medium (S21: YES), in S22 the control device 30 gives priority to the first method or second method over the other methods when determining the active conversion method. That is, the control device 30 gives the highest priority to either the first method or the second method among all the conversion methods. For example, when the second method is prioritized (the highest priority is given to the second method), the control device 30 may store a flag in the storage 31 to indicate that the second method is to be selected as the active conversion method from among the four types of conversion methods for the halftone process. In S22 the control device may give the highest priority to both the first and second methods among all the conversion methods. In this case, as in the case of FIG. 4, the control device 30 may select one of the first and second conversion methods by using (or, on the basis of) other characteristics of each type of conversion method (e.g., noticeable periodicity). Alternatively, the control device 30 may select one of the first and second conversion methods by using (or, on the basis of) an estimated time required to convert the image data. That is, the control device 30 may select one of the first and second conversion methods so that the time required to convert the image data in the halftone process can be reduced.

When the control device 30 decides in S21 that the printing medium A is not the first medium (S21: NO), in S23 the control device 30 decides whether the printing medium A is the second medium. When the control device 30 decides that the printing medium A is the second medium (S23: YES), in S24 the control device 30 gives priority to the third method over the other methods when determining the active conversion method. That is in S24 the control device 30 gives the highest priority to the third method among all the conversion methods. For example, the control device 30 stores a flag in the storage 31 to indicate that the third method should be selected as the active conversion method from among the four types of conversion methods for the halftone process. However, when the control device 30 decides in S23 that the printing medium A is not the second medium (S23: NO), i.e., when the printing medium A is the third medium, in S25 the control device 30 gives priority to the fourth method over the other methods when determining the active conversion method. That is in S25 the control device 30 gives the highest priority to the fourth method among all the conversion methods. For example, the control device 30 may store a flag in the storage 31 to indicate that the fourth method should be selected as the active conversion method from among the four types of conversion methods for the halftone process.

There may be cases in which more than one type of conversion method is compatible with one media type (or, the highest priority is given to more than one type of conversion method), as in S22 in the example of FIG. 5. In such cases, as in the case of FIG. 4 described above, the control device 30 may select one of these types of conversion methods by considering other characteristics of each type of conversion method (e.g., noticeable periodicity).

Second Example of the Decision Process

Figure 6:
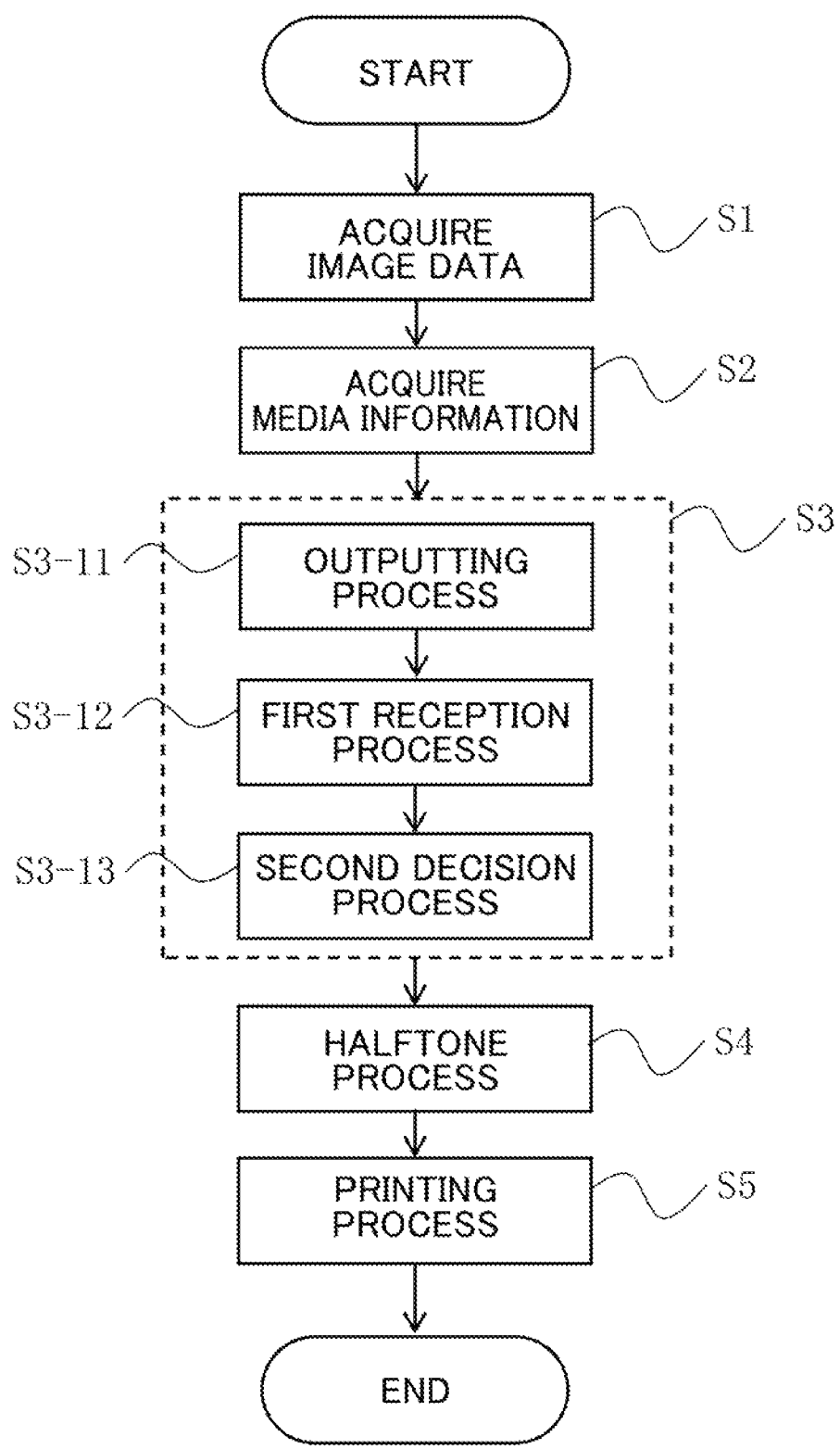
FIG. 6 is a flowchart showing a series of operations executed by the control device that includes a decision process concerning the halftone process.

FIG. 6 is a flowchart showing a series of operations executed by the control device 30 that includes another example (second example) of the decision process concerning the halftone process. The control device 30 executes the process according to this flowchart upon receiving a print job. Among the operations shown in FIG. 6, the control device 30 executes the same steps described in FIG. 3 concerning the acquisition of image data (S1), the acquisition of media information (S2), the halftone process (S4), and the printing process (S5). However, in the decision process of S3, the control device 30 executes operations different from those in the first decision process (S3-01) in FIG. 3. Accordingly, the decision process of S3 will be described here in greater detail.

In the decision process of S3 according to the second example, the control device 30 first executes an outputting process in S3-11. In the outputting process, the control device 30 outputs information on one or a plurality of types of conversion methods that are candidates for the halftone process (hereinafter called "candidate information") on the basis of the media information acquired in S2. The candidate information outputted according to this outputting process specifies the types of conversion methods selected by the control device 30 from among the plurality of conversion method types. The method of selecting these conversion method types may be one of the methods described with reference to FIG. 4 or FIG. 5, for example. For example, when selecting the conversion methods according to the example shown in FIG. 4, one or more conversion methods which are specified as compatible with the medium type are selected and outputted. When selecting the conversion methods according to the example of FIG. 5, one or more conversion methods prioritized (or given the highest priority) are selected and outputted.

Next, the control device 30 executes a first reception process in S3-12. In the first reception process, the control device 30 receives a specification via the input device 37 specifying one of the one or more types of conversion methods outputted in the outputting process of S3-11. That is, while referencing the outputted candidate information, the user operates the touchscreen or the like of the input device 37 to specify one type, whereby the control device 30 receives the specified type. Next, in S3-13 the control device 30 executes a second decision process. In the second decision process, the control device 30 decides that the active conversion method is to be the conversion method of the type received in the first reception process of S3-12. Thereafter, the control device 30 uses the active conversion method decided in S3-13 to sequentially execute the halftone process in S4 and the printing process in S5.

According to the decision process described in the second example, the control device 30 narrows down the types of conversion methods from the perspective of graininess suppression and the perspective of overengineering avoidance, and the user can refer to the candidates and set one as the conversion method for the halftone process to be used for printing. Therefore, when the user must select one conversion method from a plurality of conversion methods, the control device 30 narrows down the candidates in advance, helping the user make the final decision.

Third Example of the Decision Process

Figure 7:
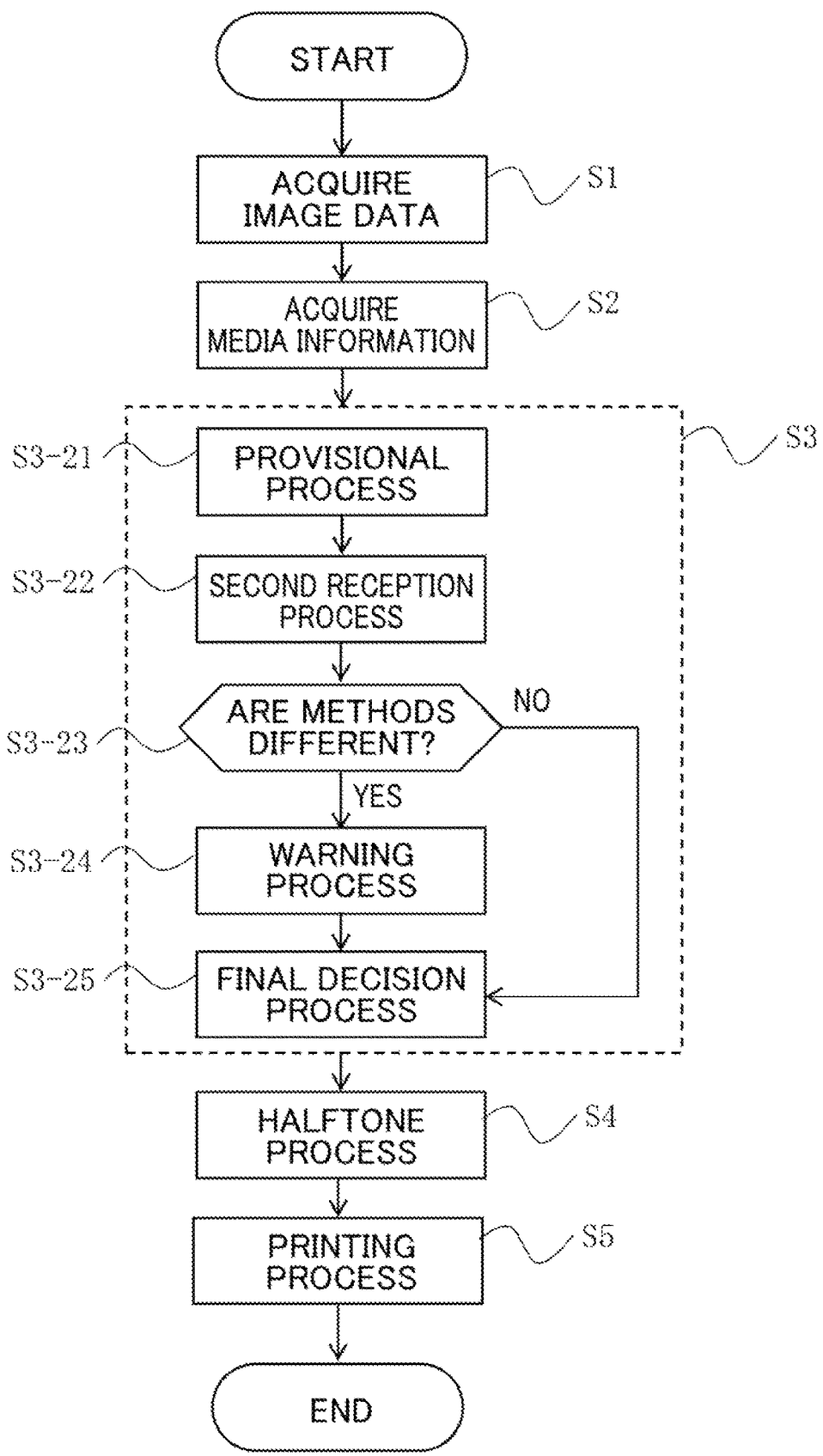
FIG. 7 is a flowchart showing a series of operations executed by the control device that includes a decision process concerning the halftone process.

FIG. 7 is a flowchart showing a series of operations executed by the control device 30 that includes another example (third example) of the decision process concerning the halftone process. The control device 30 executes the steps according to this flowchart upon receiving a print job. Among the operations shown in FIG. 7, the control device 30 executes the same steps described in FIG. 3 related to the acquisition of image data (S1), the acquisition of media information (S2), the halftone process (S4), and the printing process (S5). However, in the decision process of S3, the control device 30 executes different operations from the first decision process described in FIG. 3 (S3-01). Accordingly, the decision process in S3 will be described here in greater detail.

In the decision process of S3 according to the third example, the control device 30 executes a provisional process in S3-21. In the provisional process, the control device 30 provisionally decides one of the conversion methods for the halftone process to be the active conversion method on the basis of the media information acquired in S2. The method of determining the active conversion method in this provisional process may be one of the methods described with reference to FIG. 4 or FIG. 5, for example. For example, when provisionally selecting the conversion methods according to the example shown in FIG. 4, one or more conversion methods which are specified as compatible with the medium type are provisionally selected. When provisionally selecting the conversion methods according to the example of FIG. 5, one or more conversion methods prioritized (or given the highest priority) are provisionally selected. Information related to the type of the active conversion method decided in this provisional process need not be outputted externally by the output device 36 or the like but need only be temporarily stored internally by the printing device 1, such as in the storage 31.

Next, the control device 30 executes a second reception process in S3-22. In the second reception process, the control device 30 receives a specification of a conversion method from among the plurality types of conversion methods via the input device 37. That is, regardless of the type of conversion method decided provisionally in S3-21, the control device 30 receives a user specification for one type from among all possible conversion methods that the printing device 1 can execute in the halftone process.

Next, the control device 30 executes a determination process in S3-23. In this determination process, the control device 30 decides whether the active conversion method set provisionally in S3-21 differs in type from the user-specified conversion method received in S3-22. When the control device 30 decides that the types of methods are different (S3-23: YES), in S3-24 the control device 30 executes a warning process to notify the user. For example, the control device 30 controls the output device 36 to output a warning in the form of text, light, or sound indicating that the user-specified method of conversion differs from the conversion method set in advance (provisionally selected) by the control device 30.

Thereafter, the control device 30 executes a final decision process in S3-25 to make a final decision on the active conversion method. For example, the control device 30 may receive a new user specification for the conversion method after the user has viewed the warning. In such a case, the control device 30 sets (updates) the active conversion method to the newly specified conversion method. The control device 30 stores the newly specified conversion method in the storage 31, for example. On the other hand, when the control device 30 decides in S3-23 that the user-specified method does not differ from the method specified in advance by the control device 30 (S3-23: NO), the control device 30 advances directly to S3-25 and sets the final active conversion method to the user-specified method (i.e., the same method as the active conversion method that was provisionally set). The control device 30 then stores this final active conversion method in the storage 31, for example. Thereafter, the control device 30 uses the final active conversion method decided above to execute the halftone process of S4 and the printing process of S5 in sequence.

Note that the control device 30 may re-execute the warning process in S3-24 in a case that a new user specification of the conversion method is received in S3-25 and thereafter the newly specified conversion method also differs from the active conversion method provisionally set in S3-21. Alternatively, the control device 30 may set the new specification received from the user as the final active conversion method, regardless of whether the newly specified conversion method differs from the active conversion method provisionally set in S3-21.

According to the decision process of the third example, the control device 30 can accept a user specification for the type of conversion method to use in the halftone process while issuing a warning to the user when the user-specified type is undesirable from the perspective (or the purpose) of suppressing graininess or from the perspective of suppressing overengineering. Thus, the user can freely and easily set a conversion method for the halftone process that is appropriate for the type of printing medium A.

Variations of the Embodiment

The above embodiment describes an example of determining the active conversion method to be used in the halftone process based on the media information for the printing medium A, but the type of method may be decided by also considering the image being printed. This variation describes a method of determining the type of the active conversion method on the basis of the printing medium A and the image being printed. Such a method may be applied to the decision process shown in S3 of the flowcharts in FIGS. 3, 6, and 7, for example.

Figure 8:
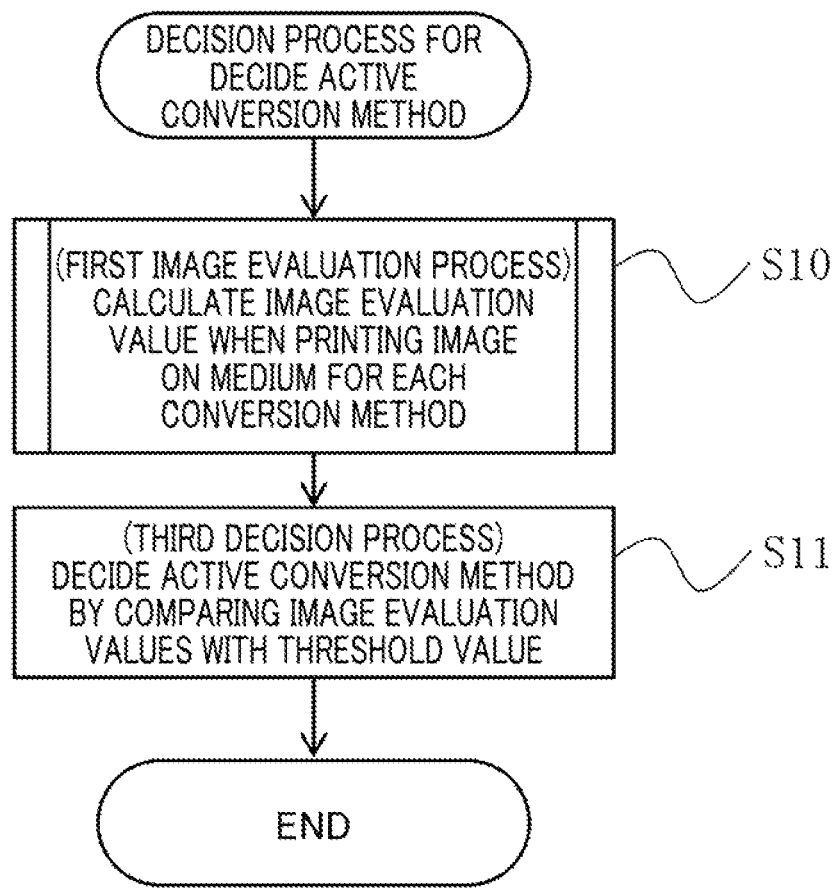
FIG. 8 is a flowchart showing a decision process executed by the control device for determining the active conversion method.

FIG. 8 is a flowchart showing steps in a decision process executed by the control device 30 for determining the active conversion method according to a variation of the embodiment. The control device 30 begins the process shown in FIG. 8 by executing a first image evaluation process in S10. In the first image evaluation process, the control device 30 calculates an evaluation value when printing the image based on both the image data acquired in S1 and the media information acquired in S2. More specifically, the control device 30 calculates an image evaluation value for each type of conversion method available for the halftone process. The image evaluation value quantifies an evaluation for printing the image on the basis of the image data acquired in S1 on a printing medium A of the type indicated in the media information acquired in S2. That is, each image evaluation value quantifies an evaluation for an image to be printed on the printing medium having the indicated media type on the basis of the print data converted from the image data according to the corresponding conversion method. In other words, each image evaluation value indicates a degree of graininess visually determined from inks in the image printed on the printing medium on the basis of the print data converted from the image data according to the corresponding conversion method. This evaluation pertains to the noticeability of graininess in this case. The image evaluation value increases as the noticeability of graininess increases in this example. In other words, the image evaluation value increases as the print quality decreases in this example. That is, the degree of graininess visually is determined from ink in the image printed on the printing medium on the basis of the print data converted from the image data according to the corresponding conversion method.

Next, the control device 30 executes a third decision process in S11. In the third decision process, the control device 30 decides the active conversion method by comparing the image evaluation value for each conversion method that was calculated in S10 with a prescribed threshold value for image evaluation values. Here, the threshold value for image evaluation values is a numerical value indicating the maximum level of graininess allowed for the image being printed. The threshold value is included in the print settings information acquired in S1 together with the image data, for example, and is stored in the storage 31. Therefore, in S11 the control device 30 compares the image evaluation values to the threshold value stored in the storage 31. The control device 30 selects the conversion method having the image evaluation value less than or equal to the prescribed threshold value.

Detailed Description of Step S10

Figure 9:
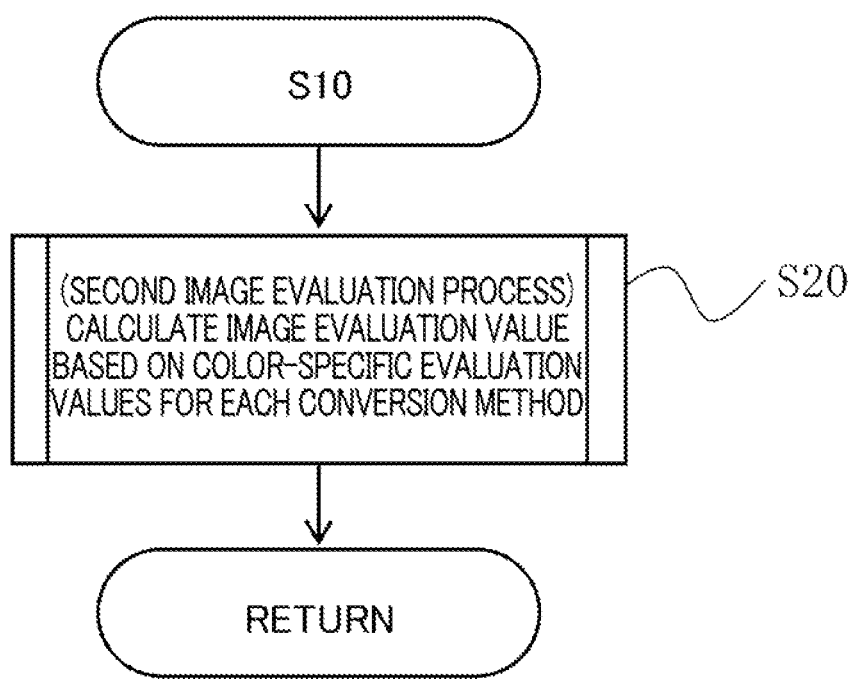
FIG. 9 is a flowchart showing a second image evaluation process which is a specific example of a first image evaluation process shown in FIG. 8.

FIG. 9 is a flowchart showing a specific example of the first image evaluation process in S10 described above. Here, the method of calculating an image evaluation value for the image to be printed will be described in greater detail. In the first image evaluation process of S10 shown in FIG. 9, the control device 30 executes a second image evaluation process in S20. In the second image evaluation process, the control device 30 acquires (calculates) an image evaluation value for each type of conversion method available for the halftone process on the basis of color-specific evaluation values for pixel color values in the image being printed.

Here, a color-specific evaluation value is found for each of a plurality of color values to represent an evaluation of a patch image formed by ejecting ink corresponding to this color value on the printing medium A. This evaluation relates to the visibility of graininess in this example. Such color-specific evaluation values are stored in the storage 31 in advance for each type of conversion method available for the halftone process and each type of printing medium A. The color-specific evaluation value increases as the noticeability of graininess increases in this example. In other words, the color-specific evaluation value increases as the print quality decreases in this example. As described above, each color-specific evaluation value corresponds to a color value and quantifies an evaluation of a patch image actually printed on a printing medium A having the corresponding media type on the basis of data converted from the corresponding color value according to the corresponding conversion method.

Figure 10:
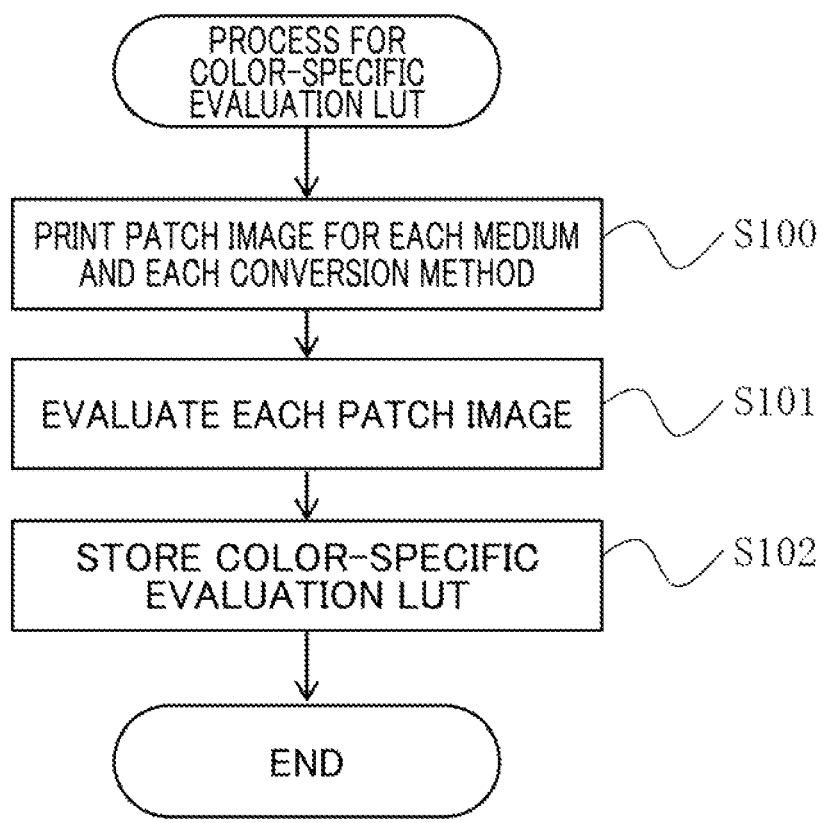
FIG. 10 is a flowchart showing a process of storing a color-specific evaluation LUT in the storage.

The color-specific evaluation values will be described next in greater detail with reference to FIGS. 10 and 11. FIG. 10 is a flowchart showing the process of creating and storing a color-specific evaluation Look Up Table (LUT) in the storage 31. The color-specific evaluation LUT is a look-up table for color-specific evaluation values. This storage process may be performed prior to shipping the printing device 1 as a product, for example. In S100 of FIG. 10, the printing device 1 is first controlled to print a patch image. A patch image is a pattern image possessing patches, which are small solid images of a single color, for each of a plurality of color values (patch color values). The patch image may contain patches for all colors that the printing device 1 can print or may be a pattern image that includes patches for the colors of a prescribed number of grid points (for example, 9*9*9 grid points in the RGB color space in the gradation range 0-255, wherein nine grip points are arranged on each of R, G, and B axes) for convenience.

These patch images are printed using each type of printing medium A and each type of conversion method in the halftone process. Therefore, when the print media A include the first through third media described above and the conversion methods for the halftone process include the first through fourth methods described above, twelve patterns of printing results are obtained.

In S101 the noticeability of graininess is quantitatively evaluated for each patch in the printed patch image. The graininess may be evaluated by a person visually judging and assigning a numerical value to each patch or by using a well-known numerical evaluation method for graininess. Examples of known numerical evaluation methods are methods using Root Mean Square (RMS) granularity expressed by the root mean square of deviation from the average density and methods using a graininess scale or the like.

The evaluation value for each patch found in S101 is a color-specific evaluation value. FIG. 11 shows a sample color-specific evaluation LUT defining color-specific evaluation values for patches corresponding to the color of each of grid points in the RGB color space. In the color-specific evaluation LUT of FIG. 11, a color-specific evaluation value is set for each patch color. However, the color-specific evaluation value for a patch may differ for different types of printing medium A and for different types of conversion method used in the halftone process. Therefore, a color-specific evaluation LUT such as that shown in FIG. 11 is created for each type of printing medium A and for each type of conversion method used in the halftone process.

In S102 the color-specific evaluation LUTs created in this way for each type of printing medium A and for each type of conversion method of the halftone process (i.e., the color-specific evaluation values for evaluating the patches) are stored in the storage 31. The grid points in the RGB color space are not limited to 9*9*9 grid and may be any number, such as 17*17*17 grid. The grid points may be arranged at regular intervals or may be arranged irregularly. Or, the color-specific evaluation LUT may include color-specific evaluation values for all the RGB values.

In the second image evaluation process of S20 in FIG. 9, the control device 30 references the color-specific evaluation LUTs described above that correspond to the acquired media information and obtains an image evaluation value for each type of conversion method available for the halftone process on the basis of the color-specific evaluation values for pixel color values. Here, the pixel color value is a color value corresponding to a pixel in the image data to be printed.

Detailed Description of Step S20

Figure 12:
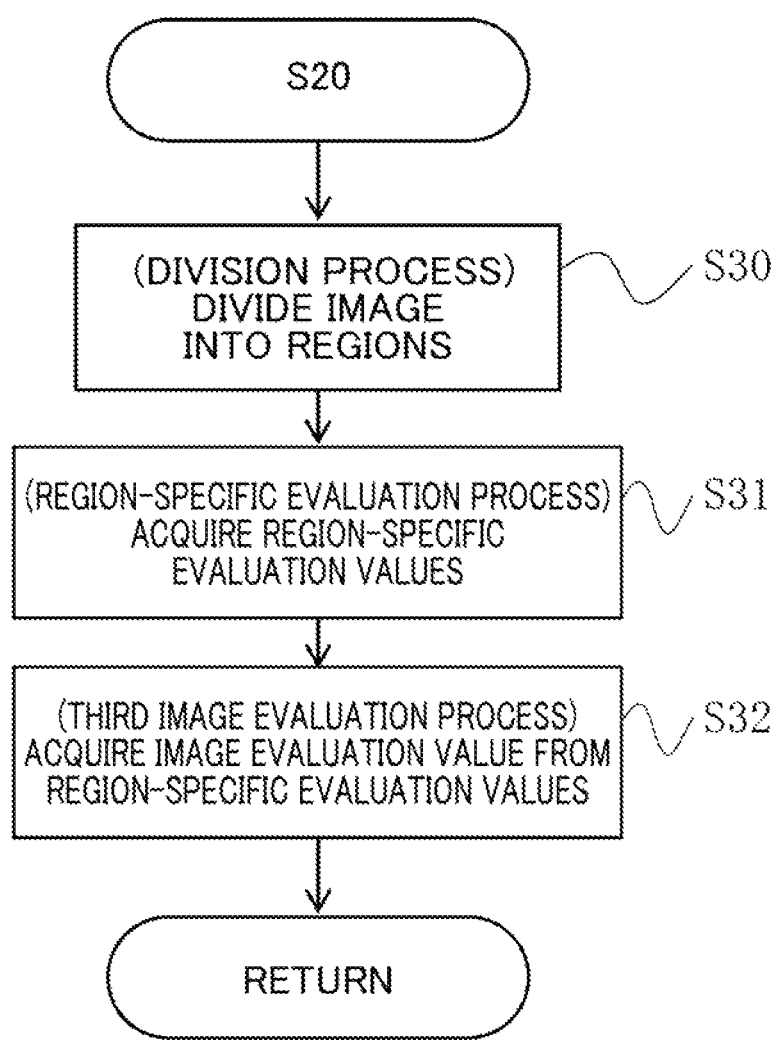
FIG. 12 is a flowchart showing a specific example of the second image evaluation process shown in FIG. 9.

FIG. 12 is a flowchart showing a specific example of the second image evaluation process in S20 described above. Here, a sample method of calculating image evaluation values based on color-specific evaluation values will be described. As shown in FIG. 12, the control device 30 executes a division process in S30 of the second image evaluation process. In the division process, the control device 30 divides the image based on the image data to be printed into a plurality of regions. Each region may be a rectangular area whose sides are no greater than the front-rear length of the nozzle rows 12. Here, the front-rear length of the nozzle rows 12 is an example of the nozzle length. As described above, the length of each region in the front-rear direction is no greater than (shorter than or equal to) the nozzle length.

Next, the control device 30 executes a region-specific evaluation process in S31. In this region-specific evaluation process, the control device 30 references color-specific evaluation LUTs corresponding to the type of printing medium A indicated in the media information that was acquired in S2 and sets a region-specific evaluation value for each region and for each conversion method. The region-specific evaluation value indicates an evaluation for each region based on the color-specific evaluation values for pixel color values of the image data included in that region. Here, each pixel color value corresponds to one pixel and includes R, G, and B values. In other words, the region-specific evaluation value quantifies an evaluation for an image in the corresponding region to be printed on the printing medium having the indicated media type on the basis of data that is converted from color values for pixels in the corresponding region according to the corresponding conversion method. Here, the region-specific evaluation value for each conversion method is based on one or more color-specific evaluation values corresponding to: the indicated media type; the conversion method; and one or more color values for one or more pixels included in the corresponding region. Next, the control device 30 executes a third image evaluation process in S32. In the third image evaluation process, the control device 30 acquires an image evaluation value for the entire image based on the region-specific evaluation values for all regions in the image data.

Figure 13A:
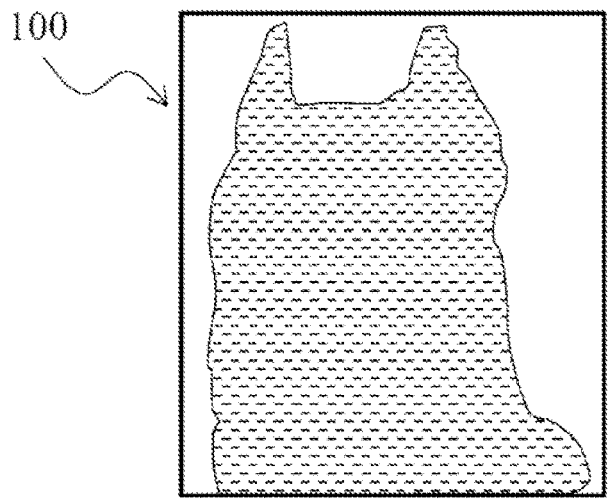
FIGS. 13A-13C are explanation diagrams illustrating the second image evaluation process.
Figure 13B:
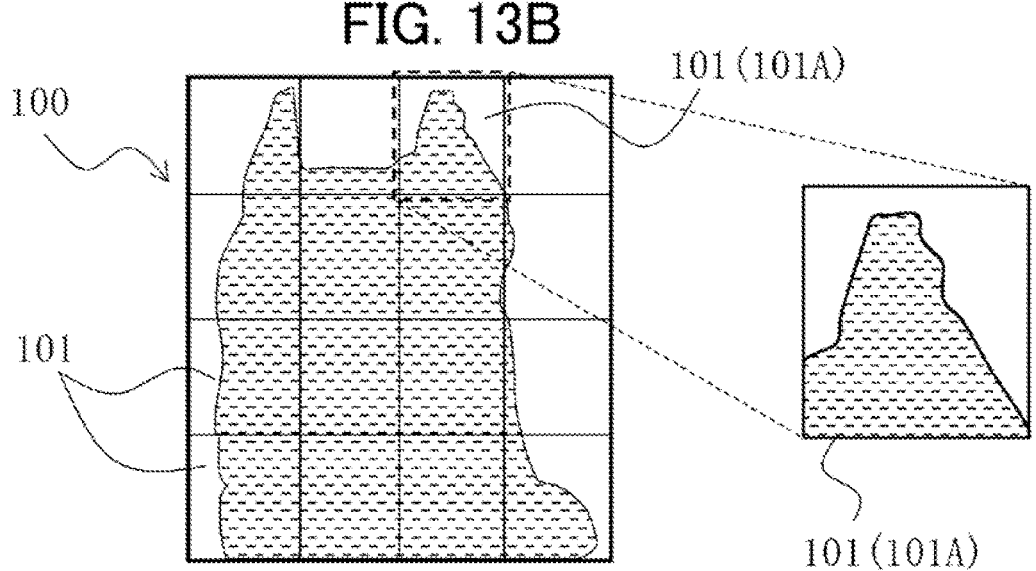
Figure 13C:
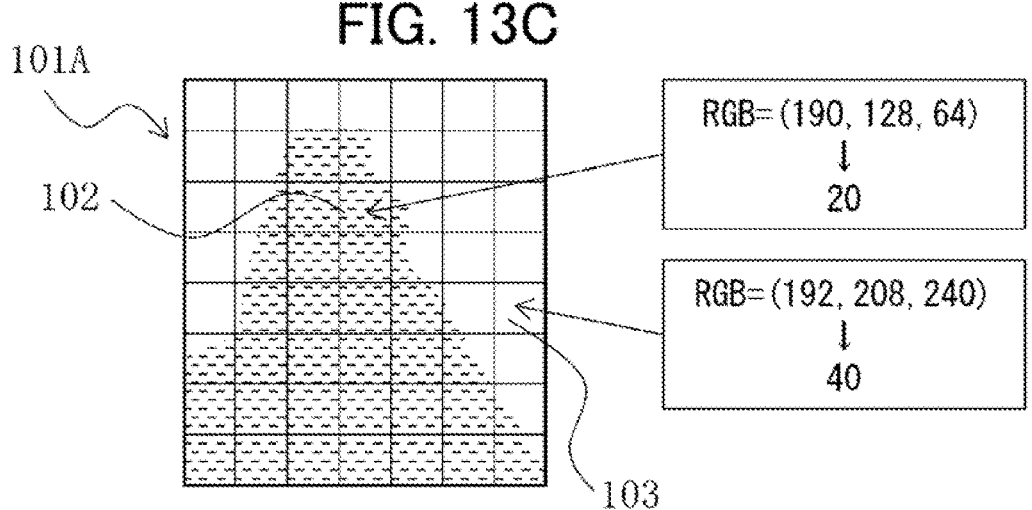

The operations in steps S30-S32 will be described in greater detail with reference to a specific example shown in FIGS. 13A through 14B. FIG. 13A shows a sample image 100 represented by the image data acquired in S1. In the division process of S30, the control device 30 divides the image 100 into a plurality of regions 101, as illustrated in FIG. 13B. FIG. 13B also includes an enlarged view of one region 101 (101A) in addition to the image 100. FIG. 13C shows details of the region 101A shown in FIG. 13B.

In the region-specific evaluation process of S31, the control device 30 acquires a color-specific evaluation value for each pixel color value of the image data in each region by referencing the corresponding color-specific evaluation LUT. In the example of FIG. 13C, the control device 30 references the color-specific evaluation LUT for RGB values "190, 128, 64" of one pixel 102 included in the region 101A and obtains the color-specific evaluation value "20". The control device 30 also references the color-specific evaluation LUT for RGB values "192, 208, 240" of another pixel 103 in the region 101A and obtains the color-specific evaluation value "40". When there is no color-specific evaluation value for a pixel color value (RGB values) of a target pixel in the color-specific evaluation LUT, a color-specific evaluation value for the pixel color value may be calculated by the interpolation using a plurality of sets of RGB values stored in the color-specific evaluation LUT neighboring the RGB values of the target pixel in the RGB color space.

Thus, in the region-specific evaluation process of S31, the control device 30 obtains color-specific evaluation values for the color values of all pixels included in a single region 101 and sets a region-specific evaluation value as the evaluation value for this region 101 based on all obtained color-specific evaluation values. The region-specific evaluation value may be obtained from the color-specific evaluation values through a method using the arithmetic mean, for example. In this case, the region-specific evaluation value can be obtained by adding the color-specific evaluation values for all pixels in the relevant region 101 and dividing the sum by the number of pixels in that region 101.

Figure 14A:
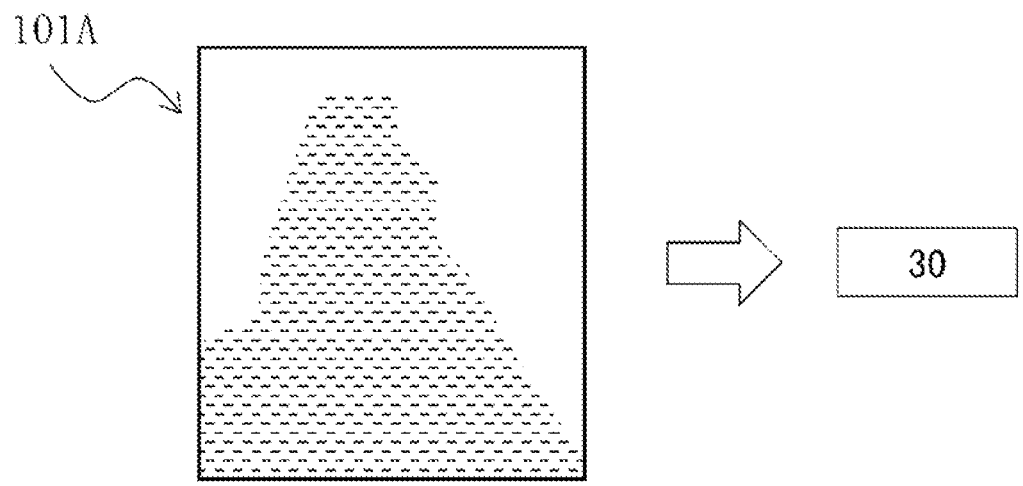
FIGS. 14A-14B are explanation diagrams illustrating the second image evaluation process.
Figure 14B:
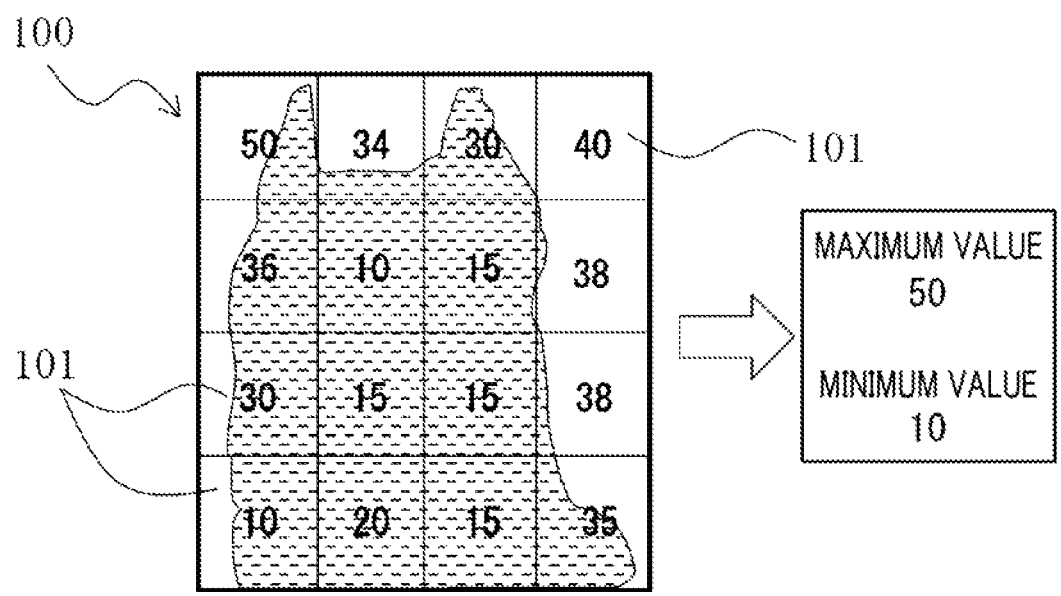

FIG. 14A shows an example in which the control device 30 obtains the region-specific evaluation value "30" for the region 101A in the region-specific evaluation process of S31. In the same process, the control device 30 obtains region-specific evaluation values for all regions 101 in the same manner. FIG. 14B shows an example in which the region-specific evaluation values obtained for all regions 101 have been displayed over their corresponding regions. In the third image evaluation process of S32, the control device 30 obtains an image evaluation value based on these region-specific evaluation values.

As one example of the third image evaluation process in S32, the control device 30 extracts the maximum or minimum value from among the region-specific evaluation values for all regions 101 and sets the image evaluation value for this image to one of the maximum or minimum value. In FIG. 14B, the control device 30 obtains the maximum value "50" and the minimum value "10" from the region-specific evaluation values for all regions 101 in the image 100. Accordingly, one of these values is set as the image evaluation value. In the example of this variation, larger numerical values are assigned as evaluation values for color values whose printed image tend to have more noticeable graininess. Therefore, from the perspective of suppressing graininess, it is preferable in this case to set the image evaluation value to the maximum region-specific evaluation value for all regions 101. Therefore, the image evaluation value is set to "50" in the example of FIG. 14B.

In the third decision process of S11 in FIG. 8, the control device 30 compares the image evaluation value obtained as described above to the threshold value stored in the storage 31 to decide the active conversion method, which is the conversion method to be used in the halftone process. Specifically, the control device 30 acquires an image evaluation value as described above for each type of conversion method available for the halftone process. As an example, image evaluation values obtained for printing according to the respective methods may be "80" for the first method, "50" for the second method, "20" for the third method, and "10" for the fourth method. Further, the threshold value stored in the storage 31 for image evaluation values will be "40".

Since the evaluation value is an index for the visibility of graininess as described above, it is preferable in this case to use a method for which the image evaluation value is no greater than the threshold value in order to suppress graininess. From the examples described above, the third method and fourth method are decided to be suitable. Therefore, in the third decision process of S11, the control device 30 sets the active conversion method to one of the third and fourth methods.

When there is more than one type of conversion method whose image evaluation value is less than or equal to the threshold value, as in this example, the control device 30 may set the active conversion method to the one whose image evaluation value is the largest or the one whose image evaluation value is the smallest. In the above case, the third method has the largest image evaluation value between the third and fourth methods. By selecting the third method, the control device 30 can shorten the data conversion time and reduce the data size while also suppressing graininess. On the other hand, the fourth method has the smallest evaluation value. By selecting the fourth method, the control device 30 can minimize graininess.

However, the method of selecting one type of conversion method to be the active conversion method when there are multiple conversion methods whose image evaluation value is less than or equal to the threshold value is not limited to the above method. For example, the control device 30 may select the active conversion method by considering periodicity and other conditions.

Through the operations according to the variation described above, the control device 30 can set a suitable type of conversion method for the halftone process with consideration for not only the type of printing medium A but also the content of the image data to be printed. Accordingly, the printing device 1 can achieve printing more suitable for the desired quality.

The printing device 1 described above employs a serial head system, but the printing device 1 may also be a device employing a line head system.

The printing device 1 is also provided with tanks 24. One end of a flexible tube 25 is connected to each tank 24, and the other end is connected to an ink supply port in the print head 10. Thus, ink is supplied from each tank 24 to the print head 10 via the corresponding tube 25, but the present disclosure is not limited to this configuration. The tanks 24 may be provided in ink cartridges. Alternatively, the tanks 24 may be provided in the carriage 19 and move together with the print head 10. Alternatively, the carriage 19 may be provided with sub-tanks for relaying ink supplied from the tanks 24 via the tubes 25 to the print head 10.

In the embodiment of this specification, the printing device 1 is a color printing device, but the printing device 1 may be a monochrome printing device instead. Further, the halftone process converts image data to print data so that the print data includes grayscale (gradation) values expressed in reduced grayscale (gradation) levels for each of the four ink colors cyan, yellow, magenta and black. Here, the image data is expressed in 256 grayscale levels, whereas the print data is expressed by the reduced grayscale levels (four levels): "no dot," "small dot," "medium dot," and "large dot". However, the present disclosure is not limited to this method. In the case of a monochrome printing device, the halftone process may simply be performed to convert each pixel value (grayscale value, gradation value) of the image data for the image being printed to one of the four grayscale (gradation) levels "no dot," "small dot," "medium dot," and "large dot."

In the embodiment of this specification, the dither method with two values (the first method) is a method of data conversion that divides the image represented by the image data into small blocks and converts the grayscale value for each block to a binary value by comparing the grayscale value to a single preset threshold value, where ink ejection is assigned to one of the binary values and ink non-ejection is assigned to the other. In the case of binary values, a large volume of ink is assigned to ink ejection. However, the present disclosure is not limited to this configuration. That is, a medium volume of ink or a small volume of ink may be assigned to ink ejection in the case of binary values.

In the example of FIG. 13C of the variation, the control device 30 obtains the color-specific evaluation value "20" for the RGB values "190, 128, 64" of a single pixel 102 in the region 101A by referencing a color-specific evaluation LUT and obtains the color-specific evaluation value "40" for the RGB values "192, 208, 240" of another pixel 103 in the region 101A by referencing the color-specific evaluation LUT. That is, the color-specific evaluation value increases as the print quality decreases, but the present disclosure is not limited to this method. For example, the color-specific evaluation value may be defined so that the color-specific evaluation value increases as the print quality increase in this variation. Specifically, the color-specific evaluation value may increase as the noticeability of graininess decreases in this variation. The color-specific evaluation LUT may be configured so that the control device 30 obtains the color-specific evaluation value "40" for the RGB values "190, 128, 64" of the pixel 102 in the region 101A and obtains the color-specific evaluation value "20" for the RGB values "192, 208, 240" of the other pixel 103 in the region 101A. In other words, while the maximum value "50" and the minimum value "10" are acquired from among the region-specific evaluation values for all regions 101 included in the image 100 of FIG. 14B, the color-specific evaluation LUT is configured to that the relationship between the maximum value "50" and the minimum value "10" is reversed from that in the embodiment. In other words, the region 101 having the maximum value "50" in the example shown in FIG. 14B may indicate the minimum value "10" in this variation while the region 101 having the minimum value "10" in in the example shown in FIG. 14B may indicate the maximum value "50".

In the variation, the image evaluation value when printing using each method is "80" for the first method, "50" for the second method, "20" for the third method, and "10" for the fourth method. That is, the image evaluation value increases as the print quality decreases, but the present disclosure is not limited to this method. For example, the image evaluation value may be defined so that the image evaluation value increases as the print quality increase in this variation. Specifically, the image evaluation value may increase as the noticeability of graininess decreases in this variation. For example, when using the color-specific evaluation LUTs described above, the image evaluation value for printing with each method may be "10" for the first method, "20" for the second method, "50" for the third method, and "80" for the fourth method. In this case, a method whose image evaluation value is greater than or equal to the threshold value is preferable for suppressing graininess. Assuming again that the threshold value stored in the storage 31 for image evaluation values is "40", then the control device 30 decides that the third method and fourth method are suitable in the above example.

Each function in the present disclosure may be implemented by processors or circuits that operates according to one or more programs configured to execute the function. The processors may be regarded as the circuits, and the circuits, units, devices, mechanisms and means may be regarded as hardware to execute the function or programmed hardware to execute the function according to one or more programs.

The technical elements described above in the embodiment and its variations may be used in any suitable combination provided unless they interference with each other. While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

INDUSTRIAL APPLICABILITY

The present disclosure may be applicable to the printing device, the control method, and the computer program that can print images on the printing medium with the suitable halftone process.

What is claimed is:

1. A printing device comprising:
   a head configured to eject ink on each of a plurality of printing media, each of the plurality of printing media being classified into one of a plurality of media types; and
   a control device configured to perform:
      acquiring image data representing an image;
      a halftone process to convert the image data to print data for controlling the head to eject the ink; and
      controlling the head to eject the ink to print the image on the basis of the print data,
   wherein the control device is configured to further perform, before the controlling:
      acquiring media information indicating, as an indicated media type, a media type from among the plurality of media types; and
      a decision process to decide a target conversion method from among a plurality of conversion methods on the basis of the indicated media type,
   wherein the halftone process converts the image data to the print data according to the target conversion method.

2. The printing device according to claim 1, further comprising:
   a storage storing correspondence information associating each media type with one or more of the conversion methods,
   wherein the decision process decides the target conversion method on the basis of both the media information and the correspondence information.

3. The printing device according to claim 1, further comprising:
   an outputting device configured to output information; and
   an input device configured to receive information,
   wherein the decision process includes:
      an outputting process to output information on one or more conversion methods among the plurality of conversion methods on the basis of the media information;
      a reception process to receive a specification of a conversion method from among the one or more conversion methods outputted in the outputting process; and
      a second decision process to decide the conversion method specified in the reception process as the target conversion method.

4. The printing device according to claim 1, further comprising:
   an outputting device configured to output warning information; and
   an input device configured to receive information,
   wherein the control device is configured to perform:
      a reception process to receive a specification of a conversion method from among the plurality of conversion methods via the input device; and
      controlling, when the specified conversion method is different from the target conversion method, the outputting device to output the warning information.

5. The printing device according to claim 1, wherein the image data includes a plurality of pixels and a plurality of color values for respective ones of the plurality of pixels,
   wherein the plurality of conversion methods includes first through fourth methods, the first method being a dither method to convert each color value in the image data into one of two values, the second method being an error diffusion method to convert each color value in the image data into one of two values, the third method being a dither method to convert each color value in the image data into one of four values, the fourth method being an error diffusion method to convert each color value in the image data into one of four values.

6. The printing device according to claim 5, wherein the plurality of media types includes a fabric type,
   wherein the decision process decides one of the first method and the second method when the media information indicates the fabric type.

7. The printing device according to claim 5, wherein the plurality of media types includes a nonglossy paper type,
   wherein the decision process decides the third method when the media information indicates the nonglossy paper type.

8. The printing device according to claim 5, wherein the plurality of media types includes a glossy paper type, and a plastic film type,
   wherein the decision process decides the fourth method when the media information indicates the glossy paper type or the plastic film type.

9. The printing device according to claim 1, wherein the control device is configured to further perform:
an image evaluation process to calculate an image evaluation value for each conversion method, each image evaluation value quantifying an evaluation for an image to be printed on a printing medium of the plurality of printing media having the indicated media type on the basis of the print data converted from the image data according to the corresponding conversion method.

10. The printing device according to claim 9, further comprising:
a storage storing a threshold value,
wherein the decision process decides the target conversion method by comparing the threshold value with each image evaluation value.

11. The printing device according to claim 10, wherein the image data includes a plurality of pixels and a plurality of color values for respective ones of the plurality of pixels,
wherein the storage further stores one or more color-specific evaluation values for each media type and for each conversion method, each color-specific evaluation value corresponding to a color value and quantifying an evaluation of a patch image actually printed on a printing medium having a corresponding media type of the plurality of media types on the basis of data converted from the corresponding color value according to a corresponding conversion method of the plurality of conversion methods,
wherein the image evaluation process calculates the image evaluation value for each conversion method on the basis of one or more color-specific evaluation values corresponding to both the conversion method and one or more color values included in the image data.

12. The printing device according to claim 11, further comprising:
a carriage supporting the head and configured to move in a moving direction,
wherein the head has a nozzle row including a plurality of nozzles aligned in a crossing direction crossing the moving direction, each nozzle being configured to eject ink, the nozzle row having a nozzle length in the crossing direction,
wherein the control device is configured to perform:
dividing the image represented by the image data into a plurality of regions, each region having a length in the crossing direction no greater than the nozzle length; and
acquiring a region-specific evaluation value for each region and for each conversion method, the region-specific evaluation value quantifying an evaluation for an image in the corresponding region to be printed on the printing medium having the indicated media type on the basis of data converted from color values for pixels in the corresponding region according to the corresponding conversion method, the region-specific evaluation value for each conversion method being based on one or more color-specific evaluation values corresponding to: the indicated media type; the conversion method; and one or more color values for one or more pixels included in the corresponding region,
wherein the image evaluation process acquires the image evaluation value for each conversion method on the basis of the region-specific evaluation values corresponding to the conversion method and all the plurality of regions included in the image.

13. The printing device according to claim 12, wherein the image evaluation process sets the image evaluation value for each conversion method to one of a maximum value and a minimum value among the region-specific evaluation values corresponding to both the conversion method and all the plurality of regions included in the image.

14. The printing device according to claim 9, further comprising:
a storage storing a threshold value,
wherein when there is a plurality of image evaluation values less than or equal to the threshold value, the decision process decides, as the target conversion method, a conversion method corresponding to one of a maximum value and a minimum value among the plurality of image evaluation values less than or equal to the threshold value.

15. The printing device according to claim 9, wherein each image evaluation value indicates a degree of graininess visually determined from ink in the image printed on the printing medium on the basis of the print data converted from the image data according to the corresponding conversion method.

16. A method for controlling a printing device including a head configured to eject ink on each of a plurality of printing media, each of the plurality of printing media being classified into one of a plurality of media types, the method comprising:
acquiring image data representing an image;
performing a halftone process to convert the image data to print data for controlling the head to eject the ink; and
controlling the head to eject the ink to print the image on the basis of the print data,
the method further comprising, before the controlling:
acquiring media information indicating, as an indicated media type, a media type from among the plurality of media types; and
performing a decision process to decide a target conversion method from among a plurality of conversion methods on the basis of the indicated media type,
wherein the halftone process converts the image data to the print data according to the target conversion method.

17. A non-transitory computer readable storage medium storing a set of program instructions for a printing device, the printing device including a head configured to eject ink on each of a plurality of printing media, each of the plurality of printing media being classified into one of a plurality of media types, the set of program instructions when executed by a computer causing the printing device to perform:
acquiring image data representing an image;
a halftone process to convert the image data to print data for controlling the head to eject the ink; and
controlling the head to eject the ink to print the image on the basis of the print data,
wherein the set of program instructions when executed by the computer causing the printing device to further perform, the control device is configured to further perform, before the controlling:
acquiring media information indicating, as an indicated media type, a media type from among the plurality of media types; and
a decision process to decide a target conversion method from among a plurality of conversion methods on the basis of the indicated media type, wherein the halftone process converts the image data to the print data according to the target conversion method.

* * * * *